(12) United States Patent
Yamamoto et al.

(10) Patent No.: US 8,460,822 B2
(45) Date of Patent: Jun. 11, 2013

(54) POSITIVE ELECTRODE ACTIVE MATERIAL FOR NON-AQUEOUS ELECTROLYTE SECONDARY BATTERY AND METHOD FOR PRODUCING THE SAME

(75) Inventors: Norihiro Yamamoto, Osaka (JP); Yutaka Kawatate, Osaka (JP); Hidekazu Hiratsuka, Osaka (JP); Takahiro Sakamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 932 days.

(21) Appl. No.: 12/270,270

(22) Filed: Nov. 13, 2008

(65) Prior Publication Data
US 2010/0112447 A1 May 6, 2010

(30) Foreign Application Priority Data
Oct. 30, 2008 (JP) .................................. 2008-279944

(51) Int. Cl.
*H01M 4/20* (2006.01)
*H01M 4/13* (2010.01)
*H01M 4/00* (2006.01)

(52) U.S. Cl.
USPC ......... 429/209; 429/223; 429/224; 252/182.1

(58) Field of Classification Search
None
See application file for complete search history.

(56) References Cited

U.S. PATENT DOCUMENTS

| | | | | |
|---|---|---|---|---|
| 8,211,397 | B2* | 7/2012 | Sun et al. | 423/420.2 |
| 2002/0061443 | A1* | 5/2002 | Nakanishi et al. | 429/223 |
| 2005/0019659 | A1* | 1/2005 | Shiozaki et al. | 429/231.3 |
| 2007/0202405 | A1 | 8/2007 | Shizuka et al. | |
| 2007/0254214 | A1* | 11/2007 | Horichi et al. | 429/231.1 |
| 2009/0233176 | A1* | 9/2009 | Kita et al. | 429/231.95 |

FOREIGN PATENT DOCUMENTS

| | | |
|---|---|---|
| JP | 2000-315502 | 11/2000 |
| JP | 2005-340186 | 12/2005 |
| JP | 2006-032241 | 2/2006 |
| JP | 2006-134816 | 5/2006 |
| JP | 2006-172753 | 6/2006 |
| JP | 2006-253119 | 9/2006 |
| JP | 2007-220475 | 8/2007 |
| JP | 2008-103308 | 5/2008 |
| JP | 2008-186753 | 8/2008 |
| KR | 10-2004-0095837 A | 11/2004 |
| KR | 2007-0010155 A | 1/2007 |
| WO | WO 2006/085467 A1 | 8/2006 |
| WO | WO 2007/116971 A1 | 10/2007 |

OTHER PUBLICATIONS

International Search Report, with partial English Translation, issued in the corresponding International Patent Application No. PCT/JP2008/003149.

* cited by examiner

*Primary Examiner* — Barbara Gilliam
*Assistant Examiner* — Jennifer Rea
(74) *Attorney, Agent, or Firm* — McDermott Will & Emery LLP (57) ABSTRACT

A positive electrode active material for a non-aqueous electrolyte secondary battery is provided. The positive electrode active material includes a composite oxide containing lithium and metal M other than lithium, and M contains Ni, Mn, and Co. The molar ratio of Ni to the total of Ni, Mn, and Co is from 0.45 to 0.65, and the molar ratio of Mn to the total of Ni, Mn, and Co is from 0.15 to 0.35. The positive electrode active material has a pressed density under a compression of 60 MPa of 3.3 g/cm$^3$ or more and 4.3 g/cm$^3$ or less. The positive electrode active material has a volume resistivity under a compression of 60 MPa of 100 Ω·cm or more and less than 1000 Ω·cm.

13 Claims, 3 Drawing Sheets

POSITIVE ELECTRODE ACTIVE MATERIAL FOR NON-AQUEOUS ELECTROLYTE SECONDARY BATTERY AND METHOD FOR PRODUCING THE SAME

FIELD OF THE INVENTION

The invention relates to an improvement in positive electrode active materials for non-aqueous electrolyte secondary batteries such as lithium secondary batteries.

BACKGROUND OF THE INVENTION

Composite oxides containing Li, Ni, Mn, and Co have recently been receiving attention as positive electrode active materials for non-aqueous electrolyte secondary batteries.

For example, Patent Document 1 proposes a lithium nickel manganese cobalt composite oxide having a volume resistivity under a compression of 40 MPa of $5 \times 10^5$ $\Omega \cdot$cm or less and a C/S ratio of 0.025 or less wherein C represents the concentration (% by weight) of carbon contained therein and S represents the BET specific surface area (m$^2$/g). The use of a positive electrode active material having a volume resistivity equal to or lower than a predetermined value and a significantly low carbon concentration permits an improvement in battery performance. Patent Documents 2 and 3 also propose a composite oxide having a volume resistivity under a compression of 40 MPa of $5 \times 10^5$ $\Omega \cdot$cm or less.

In Patent Documents 1 to 3, composite oxides are prepared by spray drying. In the case of composite oxides prepared by spray drying, it is difficult to heighten the pressed density thereof, and it is thus difficult to heighten the capacity of the battery. Increasing the Ni content can provide a high capacity positive electrode active material. However, when the Ni content becomes high, the volume resistivity of the positive electrode active material becomes excessively low. In particular, when the volume resistivity is less than 100 $\Omega \cdot$cm, the battery safety is significantly impaired. On the other hand, if the volume resistivity becomes excessively high, the electronic conductivity of the composite oxide becomes low and the reactivity of the electrode decreases, so that the cycle characteristics degrade.

Patent Document 1: Japanese Laid-Open Patent Publication No. 2005-340186
Patent Document 2: Japanese Laid-Open Patent Publication No. 2006-172753
Patent Document 3: Japanese Laid-Open Patent Publication No. 2006-253119

BRIEF SUMMARY OF THE INVENTION

It is therefore an object of the invention to provide a positive electrode active material having a relatively high Ni content and a suitable volume resistivity value, in order to realize a non-aqueous electrolyte secondary battery having high capacity while having excellent safety.

The invention relates to a positive electrode active material for a non-aqueous electrolyte secondary battery, and the positive electrode active material includes a composite oxide containing lithium and metal M other than lithium and has the following characteristics.

First, M contains Ni, Mn, and Co.

The molar ratio of Ni to the total of Ni, Mn, and Co is from 0.45 to 0.65.

The molar ratio of Mn to the total of Ni, Mn, and Co is from 0.15 to 0.35.

The positive electrode active material has a pressed density under a compression of 60 MPa of 3.3 g/cm$^3$ or more and 4.3 g/cm$^3$ or less.

The positive electrode active material has a volume resistivity under a compression of 60 MPa of 100 $\Omega \cdot$cm or more and less than 1000 $\Omega \cdot$cm.

The molar ratio of Co to the total of Ni, Mn, and Co is preferably from 0.15 to 0.25.

The molar ratio of the total of Ni, Mn, and Co to Li is preferably 0.9 or more.

In one embodiment of the invention, the composite oxide containing lithium and metal M other than lithium is represented by the general formula: $Li_aNi_xMn_yCo_zO_{2+b}$. In the general formula, $0.97 \leq a \leq 1.05$, $-0.1 \leq b \leq 0.1$, $0.45 \leq x \leq 0.65$, $0.15 \leq y \leq 0.35$, $0.15 \leq z \leq 0.25$, and $x+y+z=1$. More preferably, $0.49 \leq x \leq 0.56$, $0.24 \leq y \leq 0.31$, and $0.18 \leq z \leq 0.22$.

The positive electrode active material preferably has a tap density of 2.3 g/cm$^3$ or more and 3.0 g/cm$^3$ or less.

The positive electrode active material preferably has a specific surface area of 0.2 m$^2$/g or more and 1.0 m$^2$/g or less.

M can further include at least one selected from the group consisting of aluminum, magnesium, calcium, strontium, yttrium, ytterbium, and iron.

The invention also pertains to a non-aqueous electrolyte secondary battery including: a positive electrode including the above-described positive electrode active material; a negative electrode; a separator interposed between the positive electrode and the negative electrode; and a non-aqueous electrolyte.

The invention further relates to a method for producing the above-described positive electrode active material.

The production method includes:

(i) mixing a transition metal compound with a lithium salt to obtain a mixture, wherein the transition metal compound contains metal M other than lithium, M contains Ni, Mn, and Co, the molar ratio of Ni to the total of Ni, Mn, and Co is from 0.45 to 0.65, the molar ratio of Mn to the total of Ni, Mn, and Co is from 0.15 to 0.35, and the molar ratio of Co to the total of Ni, Mn, and Co is from 0.15 to 0.25, and wherein the molar ratio of Li to M in the mixture is from 1.00 to 1.05;

(ii) firstly baking the mixture in oxygen or air at a first baking temperature of 650° C. to 850° C. while causing the mixture to flow in a rotary kiln, to obtain a first baked mixture; and (iii) secondly baking the first baked mixture in oxygen or air at a second baking temperature higher than the first baking temperature by 50° C. or more in a furnace, to obtain the composite oxide.

The lithium salt used as a raw material is preferably lithium carbonate with a mean particle size of 6 μm or less.

The transition metal compound used as a raw material is preferably a hydroxide or an oxide.

The hydroxide is preferably prepared by adding an alkali to an aqueous solution containing Ni ions, Mn ions, and Co ions to coprecipitate Ni, Mn, and Co.

The oxide is preferably prepared by adding an alkali to an aqueous solution containing Ni ions, Mn ions, and Co ions to coprecipitate Ni, Mn, and Co to obtain a hydroxide, and baking the hydroxide in an atmosphere containing oxygen.

When the Ni content in the raw material of a positive electrode active material becomes high, the oxidation reaction of the raw material becomes difficult, and the crystal structure of the composite oxide tends to have oxygen deficiency. When the oxygen deficiency of the composite oxide increases, the volume resistivity of the positive electrode active material decreases. The use of such a positive electrode active material having a low volume resistivity results in low battery safety.

In the invention, for example, in the production process of a positive electrode active material, the molar ratio of Ni/Mn/Co contained in the raw material and the molar ratio of lithium to metal other than lithium are controlled in a relatively strict manner. This has been found to suppress oxygen deficiency. Therefore, the invention can provide a non-aqueous electrolyte secondary battery having high capacity while having excellent safety.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The positive electrode active material for a non-aqueous electrolyte secondary battery of the invention includes a composite oxide containing lithium and metal M other than lithium. M contains Ni, Mn, and Co as essential elements. The crystal structure of such a composite oxide usually has a layer structure in which oxygen is closest packed. More specifically, it is preferable that the crystal structure be hexagonal and have symmetry belonging to the space group R-3m. However, the positive electrode active material of the invention is not limited to such crystal structure. It should be noted that M can contain small amounts of various additional elements as optional elements in addition to Ni, Mn, and Co unless the effects of the invention are impaired.

The molar ratio of Ni to the total of Ni, Mn, and Co (hereinafter "Ni ratio") is limited to from 0.45 to 0.65. If the Ni ratio is less than 0.45, a positive electrode active material having a desirable capacity cannot be obtained, and the volume resistivity of the positive electrode active material may become excessively high. On the other hand, if the Ni ratio exceeds 0.65, the volume resistivity of the positive electrode active material becomes excessively low, thereby making it difficult to ensure battery safety.

Also, in the case of producing a positive electrode active material with a high Ni ratio, the Ni content in the raw material becomes high, which makes the oxidation reaction of the raw material difficult. Further, a positive electrode active material with a high Ni ratio has low resistance to moisture, and tends to deteriorate due to contact with moisture in air.

The Ni ratio is preferably in the range of 0.49 to 0.56. When the Ni ratio is in this range, the positive electrode active material has high resistance to moisture and high capacity, and the volume resistivity thereof can be controlled relatively easily. Even when the Ni ratio is 0.49 to 0.56, the volume resistivity changes greatly, but a desirable volume resistivity can be achieved by controlling the baking conditions suitably.

A raw material with a high Ni content is difficult to bake in air, and needs to be baked in oxygen atmosphere. However, in the case of producing a positive electrode active material with a Ni ratio of 0.49 to 0.56, sufficient oxidation reaction is possible even in air atmosphere if baking conditions are controlled suitably. As a result, it is possible to obtain a positive electrode active material having only a small amount of oxygen deficiency and a suitable volume resistivity at low costs.

The molar ratio of Mn to the total of Ni, Mn, and Co (hereinafter "Mn ratio") is limited to 0.15 to 0.35. If the Mn ratio is less than 0.15, the volume resistivity becomes excessively low. On the other hand, if the Mn ratio exceeds 0.35, the volume resistivity becomes excessively high. The Mn ratio is preferably 0.24 to 0.31.

The molar ratio of Co to the total of Ni, Mn, and Co (hereinafter "Co ratio") is preferably 0.15 to 0.25. If the Co ratio is less than 0.15, it is difficult to synthesize a composite oxide having sufficient crystallinity by baking, and the capacity of the active material becomes low. On the other hand, if the Co ratio exceeds 0.25, the crystallinity of the composite oxide becomes excessively high, which makes the control of the physical properties of the material difficult. In particular, the specific surface area of the active material becomes low. The Co ratio is preferably 0.18 to 0.22.

The molar ratio of the total of Ni, Mn, and Co to Li (hereinafter "NMC ratio") is preferably 0.90 or more, more preferably 0.95 or more, and most preferably 1.0. If the NMC ratio is less than 0.90, it may be difficult to obtain an active material having a desirable capacity and high safety.

When the NMC ratio is 1.0, it is preferable that the composite oxide containing lithium and metal M other than lithium be represented by, for example, the general formula: $Li_aNi_xMn_yCo_zO_{2+b}$ where $0.97 \leq a \leq 1.05$, $-0.1 \leq b \leq 0.1$, $0.45 \leq x \leq 0.65$, $0.15 \leq y \leq 0.35$, $0.15 \leq z \leq 0.25$, and $x+y+z=1$. It is also preferable that $0.49 \leq x \leq 0.56$, $0.24 \leq y \leq 0.31$, and $0.18 \leq z \leq 0.22$.

The value a represents the value of the positive electrode active material immediately after the synthesis thereof, or the value of the positive electrode active material before it is assembled into a battery. The value a changes due to battery charge/discharge. The value a of the positive electrode active material included in a fully discharged battery is also in the range of $0.97 \leq a \leq 1.05$.

The value b represents the amount of excessive or deficient oxygen contained in the positive electrode active material. When the value b is lower than −0.1, the amount of oxygen deficiency becomes large, so that a positive electrode active material having a suitable volume resistivity may not be obtained.

The pressed density of the positive electrode active material under a compression of 60 MPa needs to be 3.3 g/cm³ or more and 4.3 g/cm³ or less. If the pressed density is less than 3.3 g/cm³, a positive electrode plate having a desirable capacity cannot be obtained. On the other hand, if the pressed density exceeds 4.3 g/cm³, the porosity in the positive electrode plate becomes excessively small, and the electrode reactivity may become low. In terms of obtaining higher performance, the pressed density is preferably 3.4 g/cm³ or more and 4.1 g/cm³ or less.

The volume resistivity of the positive electrode active material under a compression of 60 MPa needs to be 100 Ω·cm or more and less than 1000 Ω·cm. If the volume resistivity is less than 100 Ω·cm, it is difficult to ensure battery safety. On the other hand, if the volume resistivity exceeds 1000 Ω·cm, the charge/discharge and cycle characteristics of the battery including such a positive electrode active material degrade. In terms of obtaining higher performance, the volume resistivity is preferably 200 Ω·cm or more and 900 Ω·cm or less.

The tap density of the positive electrode active material is preferably 2.3 g/cm$^3$ or more and 3.0 g/cm$^3$ or less, and more preferably 2.4 g/cm$^3$ or more and 2.8 g/cm$^3$ or less. When the tap density is in this range, the positive electrode active material is likely to have a preferable pressed density and a preferable volume resistivity.

The specific surface area of the positive electrode active material is preferably 0.2 m$^2$/g or more and 1.0 m$^2$/g or less, and more preferably 0.3 m$^2$/g or more and 0.8 m$^2$/g or less. When the specific surface area is in this range, the positive electrode active material is likely to have a preferable pressed density and a preferable volume resistivity.

The mean particle size of the positive electrode active material is preferably 5 μm or more and 15 μm or less. When the mean particle size is in this range, the positive electrode active material is likely to have a preferable pressed density and a preferable volume resistivity.

M can further contain various additional elements in addition to Ni, Mn, and Co. While the additional elements are not particularly limited, M can contain at least one selected from the group consisting of, for example, aluminum, magnesium, calcium, strontium, yttrium, ytterbium, and iron. These additional elements are thought to have effects such as enhancing the thermal stability of the positive electrode active material. Particularly when M contains aluminum or magnesium, the effect of enhancing thermal stability increases. Also, when M contains iron, battery polarization in the final stage of discharge is reduced. The ratio of the additional elements to M is preferably less than 10 mol %, and more preferably less than 5 mol %.

Next, the method for measuring the physical properties of a positive electrode active material is described.

The pressed density of a positive electrode active material under a compression of 60 MPa is determined as follows.

First, a positive electrode active material of a known weight W is compressed at 60 MPa into the shape of a cylindrical pellet. From the bottom area and height of the cylindrical pellet, the pellet volume V is calculated. Then, the ratio (W/V) of the active material weight to the pellet volume is calculated to obtain the pressed density.

The volume resistivity of a positive electrode active material under a compression of 60 MPa is determined as follows.

Using a powder resistivity meter and a powder probe unit (4-point probe, ring electrode), with the applied voltage limiter set to a predetermined value, the volume resistivity (Ω·cm) of a sample is measured under various pressures. And, the volume resistivity at a pressure of 60 MPa is obtained.

The tap density of a positive electrode active material is determined as follows.

A sample is placed into a glass graduated cylinder of predetermined volume, which is tapped at a predetermined stroke (20 mm) a sufficient number of times (500 times). Then, the packing density of the sample is obtained.

The specific surface area of a positive electrode active material is determined as follows.

Using a powder specific surface area analyzer, with nitrogen as adsorption gas and helium as carrier gas, a measurement is made by the BET single-point method according to the continuous flow method. Specifically, a sample is heated for deaeration at a predetermined temperature in a mixed gas atmosphere of helium and nitrogen. The sample is then cooled to the temperature of liquid nitrogen to cause the sample to adsorb nitrogen gas. Thereafter, the temperature of the sample is allowed to rise to room temperature by means of water to desorb the adsorbed nitrogen gas. The amount of the desorbed nitrogen gas is detected with a heat conductivity detector, and the specific surface area of the sample is calculated from the detected value.

The mean particle size of a positive electrode active material is determined as follows.

Using a laser diffraction scattering-type particle size distribution analyzer, the volume basis particle size distribution is measured to obtain the median diameter (D50) in the particle size distribution, and D50 is used as the mean particle size.

Next, the method of producing the positive electrode active material is described, but the production method is not to be construed as being limited to the following.

Step (i)

In the invention, the molar ratio of Ni/Mn/Co contained in a raw material and the molar ratio of lithium to metal other than lithium are controlled very strictly.

Specifically, a transition metal compound containing metal M other than lithium is mixed with a lithium salt (Li salt) so that the molar ratio of Li to M (hereinafter "Li ratio") is from 1.00 to 1.05. If the Li ratio is less than 1.00, the resulting positive electrode active material is likely to have an excessively high volume resistivity. This is probably because a small amount of lithium causes lithium ion deficiency in the crystal and hence electric charge deficiency in the crystal.

On the other hand, if the Li ratio exceeds 1.05, the resulting positive electrode active material is likely to have an excessively low volume resistivity. This is probably because a large amount of lithium results in excessive lithium ions in the crystal and hence excessive electric charge in the crystal.

The transition metal compound needs to be such that M contains Ni, Mn, and Co, that the molar ratio of Ni to the total of Ni, Mn, and Co is from 0.45 to 0.65, and that the molar ratio of Mn to the total of Ni, Mn, and Co is from 0.15 to 0.35. Also, the molar ratio of Co to the total of Ni, Mn, and Co is preferably from 0.15 to 0.25.

The transition metal compound used as the raw material is preferably a hydroxide or oxide. Hydroxides and oxides are advantageous in that by-products are unlikely to be formed and that no toxic by-product gas (e.g., NO$_x$, SO$_x$) is formed in the reaction.

The hydroxide is preferably a coprecipitated hydroxide containing Ni, Mn, and Co. By mixing a coprecipitated hydroxide and a lithium salt and baking the mixture by a predetermined method, it is possible to obtain a composite oxide in which Ni, Mn, and Co are evenly dispersed on the atomic level or nano-level.

Also, the oxide is preferably prepared by baking such a coprecipitated hydroxide in an atmosphere containing oxygen.

The coprecipitated hydroxide is produced by adding an alkali to an aqueous solution containing Ni ions, Mn ions, Co ions and, if necessary, optional elements. The alkali can be, but is not limited to, an aqueous solution of NaOH, an aqueous solution of NH$_3$, etc.

Figure 1:
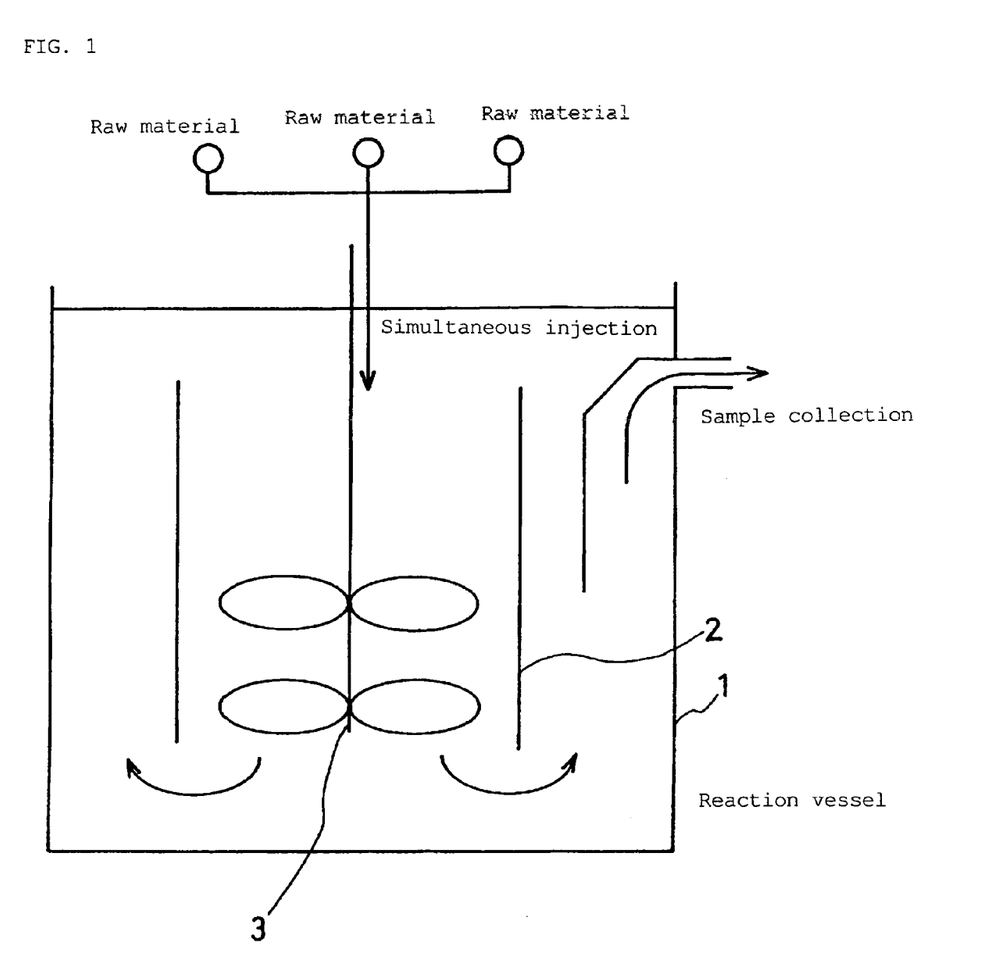
FIG. 1 is a schematic view of a device for synthesizing a hydroxide by coprecipitation.

The coprecipitated hydroxide is synthesized by using equipment as illustrated in FIG. 1.

Aqueous solutions serving as raw materials are simultaneously injected into a reaction vessel 1 at a predetermined speed. The reaction vessel 1 has a cylindrical tube 2 therein, and a stirring rod 3 is disposed in the tube. While a hydroxide is coprecipitated inside the tube, a downward (direction toward the bottom of the reaction vessel) force is applied by the stirring rod disposed in the tube. This force causes the microcrystals of the hydroxide to collide with one another, thereby promoting crystal growth and resulting in the formation of crystal particles. The particles then pass outside the tube and overflow from the system for collection, as shown by the arrows in FIG. 1.

For example, an aqueous solution of a Ni salt, an aqueous solution of a Mn salt, and an aqueous solution of a Co salt are introduced into the reaction vessel while the amounts of the solutions are adjusted so as to provide a desired composition ratio. Simultaneously with this, an alkaline aqueous solution for neutralization is injected into the reaction vessel. It is preferable that each element of nickel, manganese, and cobalt form $Me(OH)_2$ wherein Me is nickel, manganese, or cobalt in the divalent state. It should be noted that $Ni(OH)_2$, $Co(OH)_2$, and $Mn(OH)_2$ have a similar layer structure. Hence, in a hydroxide containing divalent nickel, manganese, and cobalt, these three elements are evenly dispersed on the nano-level.

In the case of producing a hydroxide by coprecipitation, manganese is highly susceptible to oxidation. Manganese is readily oxidized to a trivalent manganese ion even by a trace amount of oxygen dissolved in an aqueous solution. A trivalent manganese ion forms MnOOH. Since MnOOH has a different structure from $Ni(OH)_2$, $Co(OH)_2$, and $Mn(OH)_2$, the three elements are unlikely to be evenly dispersed. To suppress this, it is preferable to expel dissolved oxygen by bubbling an inert gas such as nitrogen gas or argon gas into the aqueous solution. Alternatively, it is preferable to add a reducing agent such as ascorbic acid to the aqueous solution.

The Ni salt can be, but is not limited to, nickel sulfate.
The Mn salt can be, but is not limited to, manganese sulfate.
The Co salt can be, but is not limited to, cobalt sulfate.
The Li salt can be lithium carbonate, lithium hydroxide, lithium oxide, or the like. Among them, lithium carbonate is advantageous in that it is inexpensive and easy to handle. Also, lithium carbonate is preferable since the raw materials are baked at a relatively high temperature in the invention.

The mean particle size of lithium carbonate is desirably 6 μm or less, and more desirably 2.5 to 5 μm. The use of lithium carbonate with a small mean particle size is thought to promote the crystal growth of the composite oxide, suppressing the undesirable inclusion of Ni into the lithium site.

Step (ii)

Next, the mixture of the transition metal compound containing metal M other than lithium and the lithium salt is firstly baked in oxygen or air at a first baking temperature of 650° C. to 850° C. while the mixture was caused to flow in a rotary kiln. That is, the first baking is performed in a fluidized state.

The conditions of the first baking of the raw material have a large effect on the performance of the final product composite oxide. When the Ni content in the raw material of the positive electrode active material becomes high, the oxidation reaction of the raw material becomes difficult, and the crystal structure of the composite oxide tends to have oxygen deficiency. To prevent this, it is very effective to bake the mixture while causing it to flow in the rotary kiln.

With respect to the baking atmosphere, air is more advantageous than oxygen in terms of production costs. In the invention, although the Ni ratio of the final product is relatively high, the Ni ratio is 0.65 or less, and it is thus possible to bake the mixture in air when baking it while causing it to flow in the rotary kiln. By causing the mixture to flow in the rotary kiln, it is possible to control the supply of oxygen to the raw material properly. The flow conditions and the air supply rate vary with intended volume resistivity. However, preferable conditions for intended volume resistivity can be found by experiments.

If the first baking temperature is lower than 650° C., it is difficult to sufficiently enhance the crystallinity of the final product. This tendency increases as the Ni content of the final product increases. On the other hand, if the first baking temperature exceeds 850° C., a disorder of a position interchange between a lithium ion and a nickel ion is likely to occur. In this case, since a nickel ion is undesirably substituted for the site a lithium ion is supposed to occupy, the movement of lithium ions due to charge/discharge is impeded, thereby resulting in low capacity.

Figure 2:
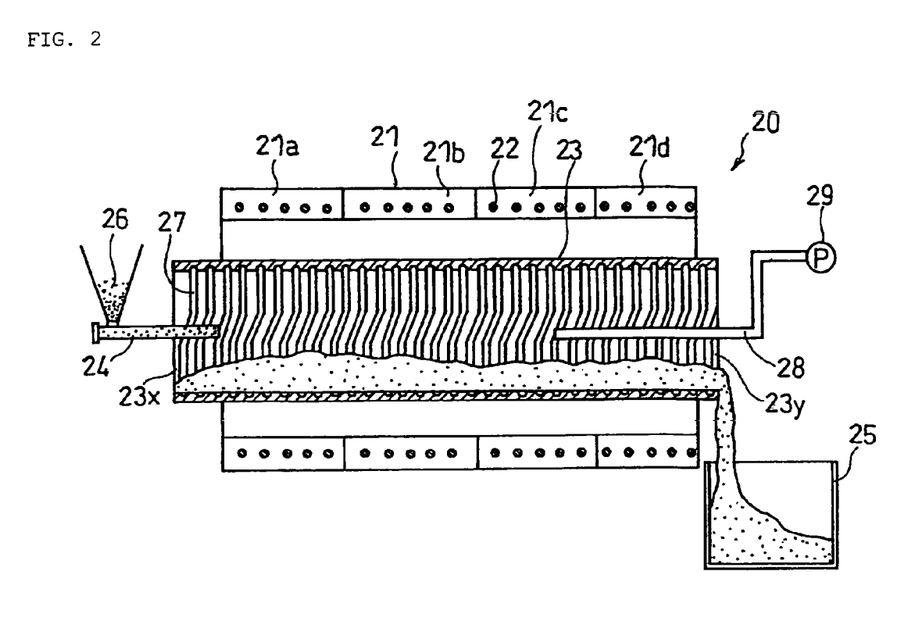
FIG. 2 is a schematic sectional view of the structure of an exemplary rotary kiln.

The first baking can be performed by using various types of rotary kilns. FIG. 2 is a schematic sectional view of the structure of an exemplary rotary kiln.

A rotary kiln 20 includes a body 21 and a cylindrical kiln 23. The rotation speed and rotation direction of the cylindrical kiln can be controlled freely. The body 21 has a heater 22 therein. The heater 22 is divided into several zones. The temperature of each zone can be controlled independently. From an end 23y of the cylindrical kiln 23, a gas supply pipe 28 is inserted into the cylindrical kiln. Through the gas supply pipe 28, oxygen or air supplied from a pump 29 is introduced into the cylindrical kiln.

At an end 23x of the cylindrical kiln 23, there is provided an inlet 24 for a mixture 26. A spiral groove or rib 27 is formed on the inner face of the cylindrical kiln 23. The groove or rib 27 has the function of causing the mixture to move from the end 23x of the cylindrical kiln 23 to the other end 23y. The reaction product after baking is discharged from the end 23y of the cylindrical kiln 23 and collected into a collection container 25.

A first zone 21a and a second zone 21b are used, for example, in the process of raising the temperature of the mixture to a predetermined temperature range. The temperature range of the second zone 21b is set higher than that of the first zone 21a.

The temperature of the first zone 21a and the second zone 21b are controlled so that the temperature of the cylindrical kiln 23 gradually rises from the end 23x inward. When the rotation direction of the cylindrical kiln 23 is the regular direction, the mixture moves toward the end 23y due to the function of the groove or rib 27. On the other hand, if the rotation direction is the opposite direction, the mixture moves toward the end 23x. The temperature of the mixture rises when the rotation direction of the cylindrical kiln 23 is the regular direction, and lowers when it is the opposite direction.

In a third zone 21c and a fourth zone 21d, the reaction between the transition metal compound and the Li salt proceeds. The temperature of the third zone 21c and the fourth zone 21d is controlled so that the temperature of the mixture is almost constant (650 to 850° C.) from the central part of the cylindrical kiln to the end 23y. Alternatively, it is controlled so that the temperature of the mixture is almost constant (650 to 850° C.) from the central part of the cylindrical kiln to a predetermined position, and that the temperature of the mixture gradually lowers from the predetermined position to the end 23y.

In the case of switching the rotation direction of the cylindrical kiln 23 regularly, by setting each rotation time for the regular direction longer than that for the opposite direction, the mixture as a whole moves toward the end 23y. At this time, each rotation time Ta for the regular direction is preferably in the range of 0.8 minute to 1.2 minutes. Also, each rotation time Tb for the opposite direction is preferably, for example, $0.6\ Ta \leq Tb \leq 0.9\ Ta$. In this way, by switching the rotation direction, the evenness of the mixed materials can be enhanced. As a result, the reactivity is improved.

In the process of raising the temperature of the mixture to the first baking temperature, the preferable average temperature increase rate of the mixture in the cylindrical kiln is, for example, 1° C./min to 8° C./min, or 2° C./min to 5° C./min.

After the first baking temperature is reached, the first baking is performed for about 5 hours to 15 hours.

Step (iii)

The first baked mixture obtained by the first baking is then secondly baked in a furnace in oxygen or air at a second baking temperature higher than the first baking temperature by 50° C. or more, preferably at a second baking temperature higher than that by 100° C. or more. By heating the first baked mixture at a higher temperature, the crystallinity of the final product is enhanced. As a result, a composite oxide having high performance can be obtained as the final product. The second baking can be performed in various furnaces. The atmosphere for the second baking may be oxygen or air.

If the difference between the first baking temperature and the second baking temperature is less than 50° C., the effect of enhancing the crystallinity of the final product decreases. However, if the second baking temperature exceeds 1000° C., a disorder of a position interchange between a lithium ion and a nickel ion is likely to occur. Therefore, the second baking temperature is preferably 1000° C. or less, and more preferably 950° C. or less. Also, the second baking is preferably performed for 8 to 25 hours, and more preferably for 10 to 20 hours.

The general configuration of the non-aqueous electrolyte secondary battery is hereinafter described.

The positive electrode usually includes a positive electrode current collector and a positive electrode mixture carried thereon. The positive electrode mixture can contain a positive electrode active material, a binder, a conductive agent, and the like. The positive electrode is produced, for example, by mixing a positive electrode mixture comprising a positive electrode active material and optional components with a liquid component to prepare a positive electrode mixture slurry, applying the slurry to a positive electrode current collector, and drying it.

Likewise, the negative electrode is produced by mixing a negative electrode mixture comprising a negative electrode active material and optional components with a liquid component to prepare a negative electrode mixture slurry, applying the slurry to a negative electrode current collector, and drying it. Examples of negative electrode active materials which can be used include metals, metal fibers, carbon materials, oxides, nitrides, tin compounds, silicon compounds, and various alloy materials. Examples of carbon materials which can be used are carbon materials such as various natural graphites, coke, graphitizable carbon, carbon fibers, spherical carbon, various artificial graphites, and amorphous carbon. Also, simple substances such as silicon (Si) or tin (Sn), alloys containing silicon or tin, and compounds or solid solutions containing silicon or tin are preferable since they have high capacity density. For example, preferable silicon compounds are $SiO_x$ wherein $0.05<x<1.95$.

Examples of binders which can be used in the positive electrode or negative electrode include polyvinylidene fluoride (PVDF), polytetrafluoroethylene, polyethylene, polypropylene, aramid resin, polyamide, polyimide, polyamideimide, polyacrylnitrile, polyacrylic acid, polymethyl acrylates, polyethyl acrylates, polyhexyl acrylates, polymethacrylic acid, polymethyl methacrylates, polyethyl methacrylates, polyhexyl methacrylates, polyvinyl acetates, polyvinyl pyrrolidone, polyether, polyethersulfone, hexafluoropolypropylene, styrene butadiene rubber, and carboxymethyl cellulose. It is also possible to use a copolymer of two or more materials selected from tetrafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. It is also possible to use two or more selected therefrom in combination.

Examples of conductive agents included in the electrode include graphites such as natural graphite and artificial graphite, carbon blacks such as acetylene black, ketjen black, channel black, furnace black, lamp black, and thermal black, conductive fibers such as carbon fibers and metal fibers, carbon fluoride, metal powders such as aluminum, conductive whiskers such as zinc oxide and potassium titanate, conductive metal oxides such as titanium oxide, and organic conductive materials such as phenylene derivatives.

With respect to the mixing ratio of the positive electrode active material, the conductive agent, and the binder, it is desirable to use 80 to 97% by weight of the positive electrode active material, 1 to 20% by weight of the conductive agent, and 1 to 10% by weight of the binder. Also, with regard to the mixing ratio of the negative electrode active material and the binder, it is dedesirable to use 93 to 99% by weight of the negative electrode active material and 0.5 to 10% by weight of the binder.

The current collector can be a long conductive substrate. The positive electrode current collector can be made of, for example, stainless steel, aluminum, or titanium. The negative electrode current collector can be, for example, stainless steel, nickel, or copper. While the thickness of the current collector is not particularly limited, it is preferably 1 to 500 μm, and more desirably 5 to 20 μm.

The separator interposed between the positive electrode and the negative electrode can be made of, for example, a microporous thin film, woven fabric, or non-woven fabric having high ion permeability, predetermined mechanical strength, and an insulating property. With respect to the material of the separator, for example, polyolefin such as polypropylene or polyethylene has good durability and a shut-down function, so it is preferable in terms of safety. The thickness of the separator is preferably 15 to 30 μm, and more preferably 10 to 25 μm. The microporous thin film may be a monolaminar film made of one material, or may be a composite film or multilaminar film made of one or more materials. The porosity of the separator (the ratio of the pore volume to the apparent volume) is preferably 30 to 70%, and more preferably 35 to 60%.

The non-aqueous electrolyte can be a liquid, gelled, or solid substance. A liquid non-aqueous electrolyte (non-aqueous electrolyte solution) can be obtained by dissolving a solute (e.g., lithium salt) in a non-aqueous solvent. The desirable amount of the solute dissolved in the non-aqueous solvent is in the range of 0.5 to 2 mol/L. A gelled non-aqueous electrolyte includes a non-aqueous electrolyte and a polymer material holding the non-aqueous electrolyte. Preferable examples of the polymer materials include polyvinylidene fluoride, polyacrylonitrile, polyethylene oxide, polyvinyl chloride, polyacrylate, and a vinylidene fluoride-hexafluoropropylene copolymer.

The kind of the non-aqueous solvent for dissolving the solute is not particularly limited; for example, cyclic carbonic acid esters, chain carbonic acid esters, and cyclic carboxylic acid esters are used. Examples of cyclic carbonic acid esters include propylene carbonate (PC) and ethylene carbonate (EC). Examples of chain carbonic acid esters include diethyl carbonate (DEC), ethyl methyl carbonate (EMC), and dimethyl carbonate (DMC). Examples of cyclic carboxylic acid esters include γ-butyrolactone (GBL) and γ-valerolactone (GVL). These non-aqueous solvents can be used singly or in combination of two or more of them.

Examples of the solute to be dissolved in the non-aqueous solvent include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, and imide salts. Examples of imide salts include lithium bistrifluoromethanesulfonyl imide (($CF_3SO_2)_2NLi$), lithium trifluoromethanesulfonyl nonafluorobutanesulfonyl imide (LiN($CF_3SO_2$)($C_4F_9SO_2$)) and lithium bispentafluoroethanesulfonyl imide (($C_2F_5SO_2)_2NLi$). These solutes can be used singly or in combination of two or more of them.

The non-aqueous electrolyte can contain various additives. Examples of additives include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), divinyl ethylene carbonate, cyclohexyl benzene, biphenyl, and diphenyl ether. They can be used singly or in combination of two or more of them. Among them, at least one selected from the group consisting of vinylene carbonate, vinyl ethylene carbonate, and divinyl ethylene carbonate is preferable.

EXAMPLES

The invention is hereinafter described specifically based on Examples, but the invention is not to be construed as being limited to the following Examples.

Example 1

(a) Synthesis of a Composite Oxide
Step (i)
An aqueous solution of nickel sulfate, an aqueous solution of manganese sulfate, and an aqueous solution of cobalt sulfate, having a concentration of 1.2 mol/L, were prepared. These aqueous solutions were introduced into a reaction vessel having an internal volume of 5 L while their amounts were adjusted so that the molar ratio was Ni:Mn:Co=5:3:2. The introduction rate of the total of these aqueous solutions was set to 1.5 ml/min. Simultaneously with this, an aqueous solution of 4.8 mol/L NaOH was introduced into the reaction vessel at an introduction rate of 0.75 ml/min. Argon gas was bubbled in the aqueous solution in the reaction vessel to expel dissolved oxygen. In this way, a coprecipitation reaction was carried out.

Also, as illustrated in FIG. 1, the aqueous solution was caused to flow from the bottom of the reaction vessel upward, so that the mixed solution was caused to collide with crystalline nuclei that were being precipitating due to coprecipitation. As a result, only the hydroxide that had crystallized to some extent was precipitated on the sample collection area. As a result, a coprecipitated hydroxide represented by $Ni_{0.5}Mn_{0.3}Co_{0.2}(OH)_2$ was obtained.

The coprecipitated hydroxide obtained was mixed with lithium carbonate (mean particle size 6 μm) so that the molar ratio of (Ni+Mn+Co):Li was 1:1.03.

It should be noted that the mean particle size (D50) of lithium carbonate is the volume basis median diameter as determined by a laser diffraction scattering-type particle size distribution analyzer.
Step (ii)
The mixture of 2 kg thus obtained was introduced into a rotary kiln having a cylindrical kiln (internal volume 10 L) as illustrated in FIG. 2. Air was introduced into the cylindrical kiln at a flow rate of 20 L/min. The temperature of the cylindrical kiln was controlled so that the temperature of the introduced mixture reached 800° C. near the center of the cylindrical kiln. That is, while the mixture of the hydroxide and the lithium carbonate moved along the groove in the rotating cylindrical kiln, it was heated to 800° C. at an average temperature increase rate of approximately 10° C./min.

Thereafter, the mixture moved through the area of the cylindrical kiln where the temperature was maintained at approximately 800° C. in a time of 10 hours, and was discharged from the cylindrical kiln as the first baked mixture.
Step (iii)
The first baked mixture obtained in the step (ii) was coarsely crushed and filled into a ceramics container. This was introduced into a stationary muffle furnace, where it was secondly baked in air at 900° C. for 20 hours to enhance the crystallinity of the baked matter. At this time, the temperature increase/decrease rate was set to 5° C./min. Thereafter, the composite oxide was broken, preliminarily crushed with a roller, and adjusted so that the mean particle size was 10 μm.

In this way, a composite oxide represented by $Li_{1.03}Ni_{0.5}Mn_{0.3}Co_{0.2}O_2$ was obtained.
[Evaluation of Positive Electrode Active Material (Composite Oxide)]
(Crystal Structure)
The composite oxide obtained was subjected to an XRD analysis, which confirmed that it had a layered rock salt structure belonging to the space group R-3m.
(Pressed Density)
The pressed density of the positive electrode active material under a compression of 60 MPa was measured.
(Volume Resistivity)
The sample weight was set to 3 g. A powder resistivity meter (Resta GP powder resistivity measurement system PD51 available from DIA INSTRUMENTS CO., LTD.) was used, and a powder probe unit (4-point probe, ring electrode, inter-electrode distance 5 mm, electrode radius 1.0 mm, sample radius 10.0 mm) was used. With the applied voltage limiter set to 90 V, the volume resistivity (Ω·cm) of the sample was measured under various pressures. The value of the volume resistivity at a pressure of 60 MPa was obtained.
(Tap Density)
The sample of 50 g was placed in a 100-ml glass graduated cylinder, which was tapped 500 times at a stroke of 20 mm. The packing density of the sample at this time was obtained.
(Specific Surface Area)
Using an automatic powder specific surface area analyzer (specific surface area analyzer HM-1201 available from Mountech Co., Ltd.), with nitrogen as adsorption gas and helium as carrier gas, a measurement was made by the BET single-point method according to the continuous flow method. Specifically, the sample was heated for deaeration at a temperature of 200° C. in a mixed gas atmosphere of helium and nitrogen. The sample was then cooled to the temperature of liquid nitrogen to cause the sample to adsorb nitrogen gas. Thereafter, the temperature of the sample was allowed to rise to room temperature by means of water to desorb the adsorbed nitrogen gas. The amount of the desorbed nitrogen gas is detected with a heat conductivity detector, and the specific surface area of the sample was calculated from the detected value.
(Mean Particle Size)
Using a laser diffraction scattering-type particle size distribution analyzer (LA-920 available from HORIBA, Ltd.), the volume basis particle size distribution was measured to obtain the median diameter (D50) in the particle size distribution. This measurement was performed after ultrasonically dispersing the sample in an aqueous solution of 0.1 wt % sodium hexametaphosphate for 5 minutes.

(b) Preparation of Positive Electrode

The composite oxide obtained in (a) above was used as the positive electrode active material.

A positive electrode mixture paste was prepared by mixing 100 parts by weight of the positive electrode active material, 3 parts by weight of acetylene black serving as a conductive agent, 4 parts by weight of polyvinylidene fluoride (PTFE) as a binder, and a suitable amount of N-methyl-2-pyrrolidone (NMP). The positive electrode mixture paste was applied onto both sides of a 15-μm thick aluminum foil, dried and rolled to obtain a positive electrode having a total thickness of 160 μm.

(c) Preparation of Negative Electrode

A negative electrode mixture paste was prepared by mixing 100 parts by weight of graphite (mean particle size 20 μm), 1 part by weight of styrene butadiene rubber (SBR) serving as a binder, 1 part by weight of carboxymethyl cellulose as a thickener, and a suitable amount of water. The negative electrode mixture paste was applied onto both sides of a 10-μm thick copper foil, dried and rolled to obtain a negative electrode having a total thickness of 180 μm.

(d) Formation of Porous Heat-Resistant Layer

A heat-resistant paste was prepared by mixing 970 g of alumina having a mean particle size of 0.3 μm, 30 g of modified polyacrylonitrile rubber, and a suitable amount of NMP. The heat-resistant paste was applied onto the surface of each negative electrode mixture layer, and dried at 120° C. in vacuum for 10 hours to form a 5-μm thick porous heat-resistant layer thereon.

(e) Preparation of Non-Aqueous Electrolyte

A non-aqueous electrolyte was prepared by dissolving $LiPF_6$ at a concentration of 1 mol/liter in a solvent mixture of ethylene carbonate (EC), dimethyl carbonate (DMC), and ethyl methyl carbonate (EMC) in a volume ratio of 1:1:1, and adding vinylene carbonate in an amount corresponding to 3% by weight of the total.

(f) Production of Cylindrical Battery

Figure 3:
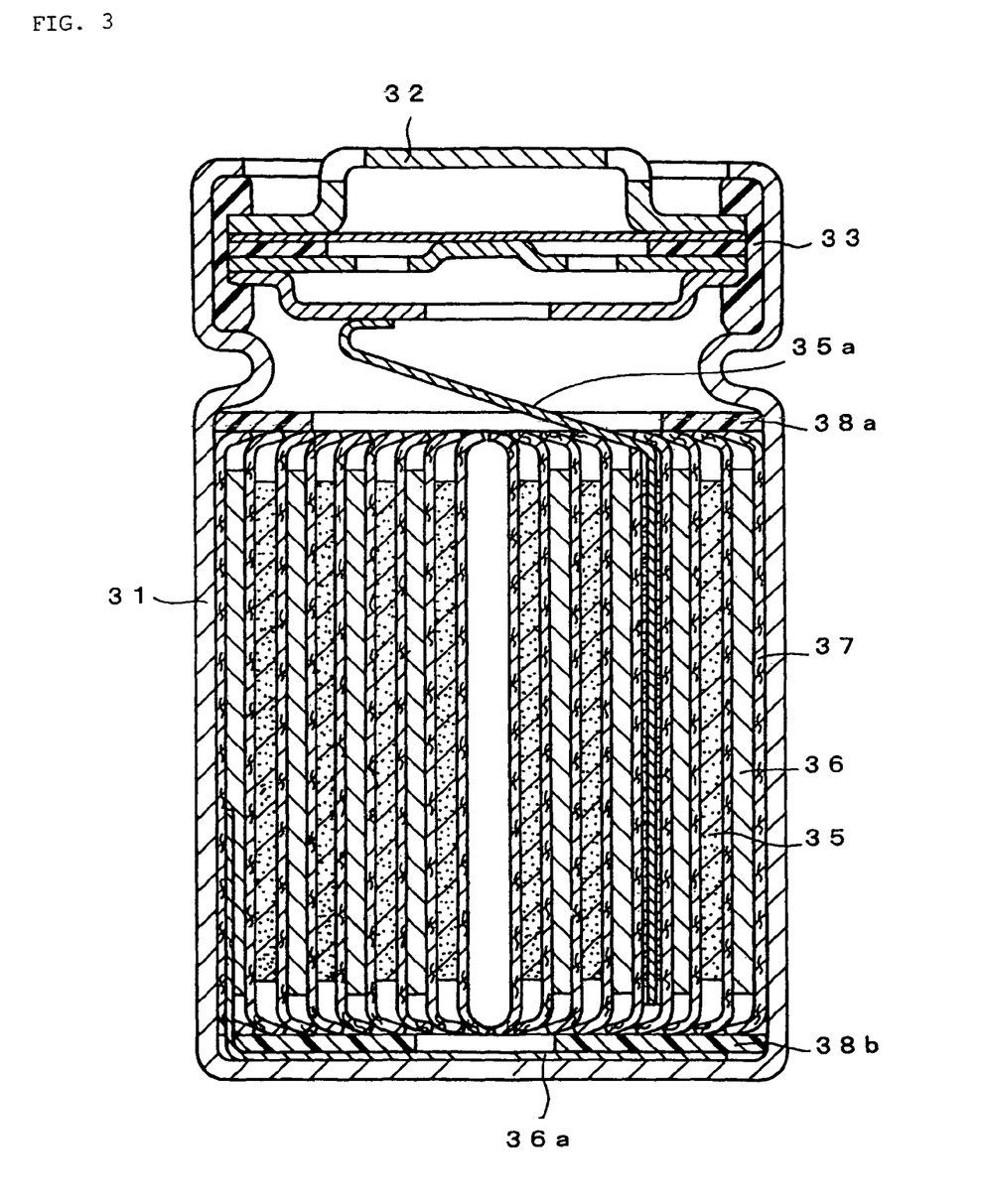
FIG. 3 is a longitudinal sectional view of an exemplary cylindrical lithium secondary battery according to an Example.

Using the positive electrode, the negative electrode, the non-aqueous electrolyte, and a separator, a cylindrical battery as illustrated in FIG. 3 was produced.

A positive electrode 35 and a negative electrode 36 with a porous heat-resistant layer (not shown) formed on each side were laminated, with a separator 37 (A089 (trade name) available from Celgard K. K.), comprising a 20-μm thick polyethylene microporous film, interposed therebetween. The laminate was wound to form a cylindrical electrode assembly. The electrode assembly was then inserted into a cylindrical iron battery can 31 (internal diameter 18 mm) plated with nickel. Insulator plates 38a and 38b were disposed on and below the electrode assembly, respectively. One end of a positive electrode lead 35a was connected to the positive electrode 35, while the other end was welded to the lower face of a seal plate 32 with a safety valve. One end of a negative electrode lead 36a was connected to the negative electrode 36, while the other end was welded to the inner bottom face of the battery can 31. Thereafter, 5.5 g of the non-aqueous electrolyte was injected into the battery can 31 to impregnate the electrode assembly with the non-aqueous electrolyte. Subsequently, the opening of the battery can 31 was fitted with the seal plate 32, and the open edge of the battery can 31 was crimped onto the circumference of the seal plate 32 with a gasket 33 therebetween. As a result, a cylindrical lithium secondary battery having an internal diameter of 18 mm, a height of 65 mm, and a design capacity of 2400 mAh was completed.

[Battery Evaluation]

The battery thus obtained was preliminarily charged and discharged twice and then stored in a 45° C. environment for 7 days. Thereafter, it was evaluated as follows.

(Cycle Characteristics)

It was charged and discharged in a 20° C. environment under the following conditions to obtain the initial discharge capacity.

Constant current charge: Charge current value 0.7 C (1680 mA)/End-of-charge voltage 4.2 V Constant voltage charge: Charge voltage value 4.2 V/End of charge current 100 mA Constant current discharge: Discharge current value 1.0 C (2400 mA)/End-of-discharge voltage 3 V Next, the same charge/discharge as that described above was repeated 500 times. When the ratio of the discharge capacity at the last cycle to the initial discharge capacity was less than 70%, it was determined to be "not acceptable (x)", and when it was 70% or more, it was determined to be "acceptable (○)".

(Nail Penetration Test)

The battery was charged to a cut-off voltage of 4.35 V at a charge current value of 1680 mA. In a 20° C. environment, an iron nail of 2.7 mm in diameter was stuck into a side face of the charged battery at a speed of 5 mm/sec, and the temperature of the battery was measured with a thermocouple attached to the side face of the battery. The temperature after seconds was obtained. When the obtained temperature was 130° C. or more, it was determined to be "unacceptable (x)", and when it was lower than 130° C., it was determined to be "acceptable (○)".

Example 2

A positive electrode active material was synthesized in the same manner as in Example 1 except that the mean particle size of the composite oxide was changed to 8 μm by reducing the particle size of the raw material hydroxide. A battery was produced in the same manner and evaluated in the same manner.

Example 3

A positive electrode active material was synthesized in the same manner as in Example 1 except that the mean particle size of the composite oxide was changed to 12 μm by increasing the particle size of the raw material hydroxide. A battery was produced in the same manner and evaluated in the same manner.

Comparative Example 1

A positive electrode active material was synthesized by the same spray drying process as that of Patent Document 1.

$Ni(OH)_2$, $Mn_3O_4$, and $Co(OH)_2$ were weighed and mixed so that the molar ratio of Ni:Mn:Co was 1:1:1. Pure water was added to the mixture to form a slurry. While the slurry was stirred, the solid contents in the slurry were crushed to a mean particle size of 0.15 μm. The slurry was then spray dried with a spray dryer, to obtain a particulate powder. The particulate powder was mixed with a LiOH powder which had been crushed to a mean particle size of 20 μm or less, so that the molar ratio of Li/(Ni+Mn+Co) was 1.03. This mixed powder of approximately 6 g was placed in a 100-mL plastic jar, tightly sealed in, and mixed by hand shaking it approximately 160 times per minute at a stroke of approximately 20 cm for 20 minutes.

Thereafter, the mixed powder was placed in an alumina crucible and firstly baked in a muffle furnace at 800° C. for 10 hours while air was supplied thereinto. It was then secondly baked at 900° C. for 20 hours. At this time, the temperature increase/decrease rate was set to 5° C./min. The composite oxide obtained was broken, preliminarily crushed with a roller, and adjusted so that the mean particle size was 10 μm.

In this way, a composite oxide represented by $Li_{1.03}Ni_{1/3}Mn_{1/3}Co_{1/3}O_2$ was obtained.

Comparative Example 2

A positive electrode active material was synthesized in the same manner as in Example 1 except that the coprecipitated hydroxide and lithium carbonate were mixed so that the molar ratio of (Ni+Mn+Co):Li was 1.00:1.10. A battery was produced in the same manner and evaluated in the same manner.

Comparative Example 3

A positive electrode active material was synthesized in the same manner as in Example 1 except that the coprecipitated hydroxide and lithium carbonate were mixed so that the molar ratio of (Ni+Mn+Co):Li was 1.00:0.95. A battery was produced in the same manner and evaluated in the same manner.

Comparative Example 4

The mixture of the coprecipitated hydroxide and lithium carbonate was introduced into a muffle furnace, not a rotary kiln. While air was supplied, the mixture was firstly baked in the muffle furnace at 800° C. for 10 hours, and then secondly baked at 900° C. for 20 hours. At this time, the temperature increase/decrease rate was set to 5° C./min. Except for the above, in the same manner as in Example 1, a positive electrode active material was synthesized. A battery was produced in the same manner and evaluated in the same manner.

The evaluation results of Examples 1 to 3 and Comparative Examples 1 to 4 are shown in Tables 1 and 2.

TABLE 1

|  |  |  | Example 1 | Example 2 | Example 3 |
|---|---|---|---|---|---|
| Conditions | Li ratio |  | 1.03 | 1.03 | 1.03 |
|  | Ni:Mn:Co |  | 5:3:2 | 5:3:2 | 5:3:2 |
|  | Preparation of raw material |  | Coprecipitation | Coprecipitation | Coprecipitation |
| Physical properties | Pressed density | G/cm³ | 3.6 | 3.4 | 4.1 |
|  | Volume resistivity | Ω·cm | 300 | 200 | 360 |
|  | Tap density | G/cm³ | 2.50 | 2.30 | 2.80 |
|  | Specific surface area | M²/g | 0.5 | 0.8 | 0.3 |
| Battery characteristics | Initial capacity | mAh | 2400 | 2400 | 2400 |
|  | Cycle characteristic |  | ○ | ○ | ○ |
|  | Nail penetration test |  | ○ | ○ | ○ |
| Baking conditions | First baking | Type | Flow type | Flow type | Flow type |
|  |  | Condition | 800° C. 10 hours | 800° C. 10 hours | 800° C. 10 hours |
|  | Second baking | Type | Stationary type | Stationary type | Stationary type |
|  |  | Condition | 900° C. 20 hours | 900° C. 20 hours | 900° C. 20 hours |

Flow type: a rotary kiln was used.
Stationary type: a muffle furnace was used.

TABLE 2

|  |  |  | Comp. Ex. 1 | Comp. Ex. 2 | Comp. Ex. 3 | Comp. Ex. 4 |
|---|---|---|---|---|---|---|
| Conditions | Li ratio |  | 1.03 | 1.10 | 0.95 | 1.03 |
|  | Ni:Mn:Co |  | 1:1:1 | 5:3:2 | 5:3:2 | 5:3:2 |
|  | Preparation of raw material |  | Spray drying | Coprecipitation | Coprecipitation | Coprecipitation |
| Physical properties | Pressed density | G/cm³ | 3.2 | 3.5 | 3.4 | 3.6 |
|  | Volume resistivity | Ω·cm | 180 | 50 | 1800 | 70 |
|  | Tap density | G/cm³ | 1.80 | 2.50 | 2.40 | 2.50 |
|  | Specific surface area | M²/g | 1.0 | 0.5 | 0.6 | 0.7 |
| Battery characteristics | Initial capacity | mAh | 2250 | 2400 | 2400 | 2400 |
|  | Cycle characteristic |  | ○ | ○ | x | ○ |
|  | Nail penetration test |  | ○ | x | ○ | x |
| Baking conditions | First baking | Type | Stationary type | Flow type | Flow type | Stationary type |
|  |  | Condition | 800° C. 10 hours | 800° C. 10 hours | 800° C. 10 hours | 800° C. 10 hours |
|  | Second baking | Type | Stationary type | Stationary type | Stationary type | Stationary type |
|  |  | Condition | 900° C. 20 hours | 900° C. 20 hours | 900° C. 20 hours | 900° C. 20 hours |

Flow type: a rotary kiln was used.
Stationary type: a muffle furnace was used.

The results of Tables 1 and 2 show that the volume resistivity makes a large difference in cycle characteristic and safety among the batteries. They also indicate that the positive electrode active material prepared by spray drying does not provide a desirable high capacity since it has a low bulk density and a low pressed density. They also indicate that in Comparative Examples 2 and 4 with a volume resistivity of less than 100 Ω·cm, it is difficult to ensure battery safety, and that in Comparative Example 3 with a volume resistivity of more than 1000 Ω·cm, the cycle characteristic is insufficient.

The invention is applicable to the field of non-aqueous electrolyte batteries including lithium secondary batteries. Non-aqueous electrolyte secondary batteries are useful as the power source for electronic devices such as notebook personal computers, cellular phones, and digital still cameras, and as the power source for power storage and electric vehicles in which high power is required.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material for a non-aqueous electrolyte secondary battery,
   the positive electrode active material comprising a composite oxide containing lithium and metal M other than lithium,
   M containing Ni, Mn, and Co,
   the molar ratio of Ni to the total of Ni, Mn, and Co being from 0.45 to 0.65,
   the molar ratio of Mn to the total of Ni, Mn, and Co being from 0.15 to 0.35, the positive electrode active material being prepared by coprecipitation with inert gas being bubbled during the coprecipitation or with oxygen being removed during the coprecipitation,
   the positive electrode active material having a pressed density under a compression of 60 MPa of 3.3 g/cm$^3$ or more and 4.3 g/cm$^3$ or less, and
   the positive electrode active material having a volume resistivity under a compression of 60 MPa of 100 Ω·cm or more and less than 1000 Ω·cm.

2. The positive electrode active material in accordance with claim 1, wherein the molar ratio of Co to the total of Ni, Mn, and Co is from 0.15 to 0.25.

3. The positive electrode active material in accordance with claim 1, wherein the molar ratio of the total of Ni, Mn, and Co to Li is 0.9 or more.

4. The positive electrode active material in accordance with claim 1, wherein the composite oxide is represented by the general formula: $Li_aNi_xMn_yCo_zO_{2+b}$ wherein $0.97 \leq a \leq 1.05$, $-0.1 \leq b \leq 0.1$, $0.45 \leq x \leq 0.65$, $0.15 \leq y \leq 0.35$, $0.15 \leq z \leq 0.25$, and $x+y+z=1$.

5. The positive electrode active material in accordance with claim 4, wherein $0.49 \leq x \leq 0.56$, $0.24 \leq y \leq 0.31$, and $0.18 \leq z \leq 0.22$.

6. The positive electrode active material in accordance with claim 1, wherein the positive electrode active material has a tap density of 2.3 g/cm$^3$ or more and 3.0 g/cm$^3$ or less.

7. The positive electrode active material in accordance with claim 1, wherein the positive electrode active material has a specific surface area of 0.2 m$^2$/g or more and 1 m$^2$/g or less.

8. The positive electrode active material in accordance with claim 1, wherein M further includes at least one selected from the group consisting of aluminum, magnesium, calcium, strontium, yttrium, ytterbium, and iron.

9. A method for producing a positive electrode active material for a non-aqueous electrolyte secondary battery comprising a composite oxide containing lithium and metal M other than lithium, the method comprising:
   (i) mixing a transition metal compound with a lithium salt to obtain a mixture,
   wherein the transition metal compound contains metal M other than lithium, M contains Ni, Mn, and Co, the molar ratio of Ni to the total of Ni, Mn, and Co is from 0.45 to 0.65, the molar ratio of Mn to the total of Ni, Mn, and Co is from 0.15 to 0.35, and the molar ratio of Co to the total of Ni, Mn, and Co is from 0.15 to 0.25, and
   wherein the molar ratio of Li to M in the mixture is from 1.00 to 1.05 and the transition metal compound is prepared by coprecipitation with inert gas being bubbled during the coprecipitation or with oxygen being removed during the coprecipitation;
   (ii) firstly baking the mixture in oxygen or air at a first baking temperature of 650° C. to 850° C. while causing the mixture to flow in a rotary kiln, to obtain a first baked mixture; and
   (iii) secondly baking the first baked mixture in oxygen or air at a second baking temperature higher than the first baking temperature by 50° C. or more in a furnace, to obtain the composite oxide, wherein the positive electrode active material has a pressed density under a compression of 60 MPa of 3.3 g/cm$^2$ or more and 4.3 g/cm$^3$ or less, and a volume resistivity under a compression of 60 MPa of 100 Ω·cm or more and less than 1000 Ω·cm.

10. The method for producing a positive electrode active material in accordance with claim 9, wherein the lithium salt is lithium carbonate with a mean particle size of 6 μm or less.

11. The method for producing a positive electrode active material in accordance with claim 9,
   wherein the transition metal compound is a hydroxide, and
   the hydroxide is prepared by adding an alkali to an aqueous solution containing Ni ions, Mn ions, and Co ions to coprecipitate Ni, Mn, and Co.

12. The method for producing a positive electrode active material in accordance with claim 9,
   wherein the transition metal compound is an oxide, and
   the oxide is prepared by adding an alkali to an aqueous solution containing Ni ions, Mn ions, and Co ions to coprecipitate Ni, Mn, and Co to obtain a hydroxide, and baking the hydroxide in an atmosphere containing oxygen.

13. A non-aqueous electrolyte secondary battery comprising: a positive electrode including the positive electrode active material of claim 1; a negative electrode; a separator interposed between the positive electrode and the negative electrode; and a non-aqueous electrolyte.

* * * * *